United States Patent

[11] 3,632,132

[72] Inventor Robert W. Richardson
Orchard Lake, Mich.
[21] Appl. No. 38,619
[22] Filed Apr. 20, 1970
[45] Patented Jan. 4, 1972
[73] Assignee Eaton Yale & Towne Inc.
Cleveland, Ohio
Original application Aug. 16, 1967, Ser.
No. 661,086, now Patent No. 3,514,124.
Divided and this application Apr. 20, 1970,
Ser. No. 38,619

[54] VEHICLE SAFETY DEVICE
4 Claims, 6 Drawing Figs.
[52] U.S. Cl....................................................280/150 AB,
180/90
[51] Int. Cl........................................................B60r 21/10
[50] Field of Search............................................ 280/150;
180/90; 244/121, 122

[56] References Cited
UNITED STATES PATENTS
2,806,737 9/1957 Maxwell........................ 280/150
2,844,387 7/1958 Shaw............................. 280/150
3,172,684 3/1965 Isaac.............................. 280/150
3,414,292 12/1968 Oldberg et al.................. 280/150

FOREIGN PATENTS
609,624 9/1960 Italy............................. 280/150

Primary Examiner—Kenneth H. Betts
Attorney—Yount, Flynn & Tarolli

ABSTRACT: A safety apparatus is operable to protect an occupant or occupants of a vehicle during a collision. The safety apparatus includes a safety device which is adapted to be mounted on an interior part of the vehicle. The safety device comprises an energy-absorbing panel member which is releasably secured to an interior part of the vehicle and contoured so as to form a part of the interior design and means for moving the panel member relative to the occupant or occupants to restrain the same against movement during a collision and absorb the energy. The means for moving the panel comprises an expansible confinement secured to the inner side of the panel, the confinement when expanded moving the panel outwardly of the interior part. The safety device further includes a porous, energy absorbing cushion means disposed behind the panel for absorbing the energy of the occupant or occupants upon the latter impacting thereagainst when the confinement is not expanded. The panel may be located at any suitable location within the automobile. In the illustrated embodiments, the panel comprises a portion of the dashboard or the entire dashboard of the vehicle and/or a panel mounted on the front seat for protecting either the occupants sitting in the front or rear seat of the vehicle.

PATENTED JAN 4 1972

INVENTOR.
ROBERT W. RICHARDSON

ATTORNEYS

INVENTOR.
ROBERT W. RICHARDSON

ATTORNEYS

INVENTOR.
ROBERT W. RICHARDSON

ATTORNEYS

VEHICLE SAFETY DEVICE

This is a divisional of application Ser. No. 661,086, filed Aug. 16, 1967, now U.S. Pat. No. 3,514,124.

The present invention relates to vehicle safety apparatus, and in particular to a vehicle safety apparatus having a safety device of a construction which is adapted to be mounted on an interior part of an automotive vehicle and which is operable to protect an occupant or occupants of the vehicle during a collision.

An object of the present invention is to provide a new and improved safety apparatus for use in a vehicle and which includes a contoured panel or member releasably secured to an interior part of the vehicle and which forms a part of the interior styling and appearance of the vehicle and means operatively connected with the panel for moving the panel away from the interior part toward an occupant of the vehicle to restrain the occupant against movement during a collision.

Another object of the present invention is to provide a new and improved safety apparatus, as defined in the preceding object, and in which the panel is releasably secured to the back side of the front seat of the vehicle and extends generally longitudinally thereacross, the panel being moved toward the back of the back seat of the vehicle to restrain any occupants sitting in the back seat against movement during a collision.

Yet another object of the present invention is to provide a new and improved vehicle safety apparatus of the character referred to above and in which the panel is a dashboard or dashboard portion releasably secured to a dashboard support, the dashboard or dashboard portion being moved toward the back of the front seat of the vehicle to restrain the occupant or occupants sitting in the front seat against movement during a collision.

A still further object of the present invention is to provide a new and improved vehicle safety apparatus of the character referred to and in which the panel is releasably secured to the top of one of the seats of the vehicle and extends generally longitudinally thereacross, the panel being moved upwardly relative to the seat to provide a headrest to restrain the occupants sitting in the seat against rearward movement during a collision, and thus prevent or minimize injuries due to whiplash.

A still further object of the present invention is to provide a new and improved safety apparatus of the character referred to above and in which the means for moving the panel includes an inflatable confinement or bag which is secured to the panel on the inner side thereof and means for inflating the confinement in response to a collision occuring whereby the confinement will move the panel relative to the occupant or other occupants of the vehicle to restrain the same against movement.

Another object of the present invention is to provide a new and improved vehicle safety apparatus, as noted in the next preceding object, and which includes a container having a supply of compressed fluid for inflating the confinement and an actuating mechanism operable to release the compressed fluid from the container to inflate the confinement in response to a collision occurring, and wherein the actuating mechanism is electrically actuated and includes a battery and collision-sensing means disposed within the inflatable confinement.

Another object of the present invention is to provide a new and improved vehicle safety apparatus, as noted in the next preceding paragraph, and wherein the battery and collision-sensing means is disposed within the container containing the supply of fluid.

Another object of the present invention is to provide a new and improved safety apparatus of the character referred to above and which includes energy-absorbing cushion means disposed behind the panel, the cushion means providing a cushion for absorbing any impacting force of the occupant or occupants against the panel when the latter is secured to the interior part of the vehicle and the occupant or occupants engage the panel, such as would occur when the confinement is not inflated or which would occur in the event the panel is bottomed against the cushion means by the impacting force of the occupant of occupants after the confinement is inflated.

Yet another object of the present invention is to provide a new and improved vehicle safety apparatus which includes a container having a supply of compressed fluid and an inflatable confinement which is inflatable when the compressed fluid is released from the container to provide a restraint to hold the occupants against movement, and which includes porous, energy-absorbing cushion means so constructed and arranged that it defines a diffuser for the fluid to control the inflation of the confinement and also provides a cushion for absorbing any impacting force of the occupant or occupants when the latter engage the cushion means, such as would occur if the confinement is not inflated.

Yet another object of the present invention is to provide a new and improved safety apparatus wherein the panel, inflatable confinement, the compressed fluid reservoir for inflating the confinement and the cushion means comprise a preassembled unit which is adapted to be mounted as a unit on an interior part of the automobile.

Another object of the present invention is to provide a new and improved safety device which is of a unitary, simple, reliable and economical construction and which can be readily mounted on an interior part of a vehicle, the safety device including a contoured panel member which is adapted to be releasably connected to the interior part of the vehicle and to form a part of the interior styling and design of the vehicle, as well as to provide a cover for the other parts of the safety device to protect the same from the elements and from scratching, etc., when mounted in place.

The present invention further resides in certain novel constructions and arrangements of parts, and further objects and advantages of the present invention will be apparent to those skilled in the art to which it relates and from the following detailed description of the illustrated embodiment thereof made with reference to the accompanying drawing forming a part of this specification and in which similar reference numerals are employed to designated corresponding parts throughout the several views, and in which.

The novel safety apparatus of the present invention may be employed in various kinds or types of vehicles, but is particularly susceptible for use in automotive vehicles and airplanes, and for purpose of illustration is herein shown and described as being used in an automobile 10.

The safety apparatus of the present invention broadly includes a plurality of preassembled unitary safety devices which are adapted to be mounted on interior parts of the automobile 10. The safety devices each includes panel or member which is releasably secured to an interior part and means, preferably an inflatable confinement or bag, for moving the panel relative to an occupant or occupants of the vehicle to provide a restraint to limit movement of the occupant or occupants and absorb the energy of the occupant or occupants as they engage the panel and confinement during a serious or critical collision. The panel is releasably secured to the interior part and covers the inflatable confinement, and is contoured so as to form a part of the interior design or style of the automobile and give a pleasing appearance.

The safety devices embodying the present invention may be located at any suitable location in the automobile and with the associated panels thereof being contoured so as to form the adjacent part of the interior design. In accordance with the preferred embodiment, one of the safety devices is mounted on a suitable support structure for the dash of the vehicle and with the associated panel thereof being at least a part of the dashboard and another is mounted on the back side of the front seat of the vehicle and with the associated panel thereof being contoured so as to form a part of the front seat design.

Figure 1:
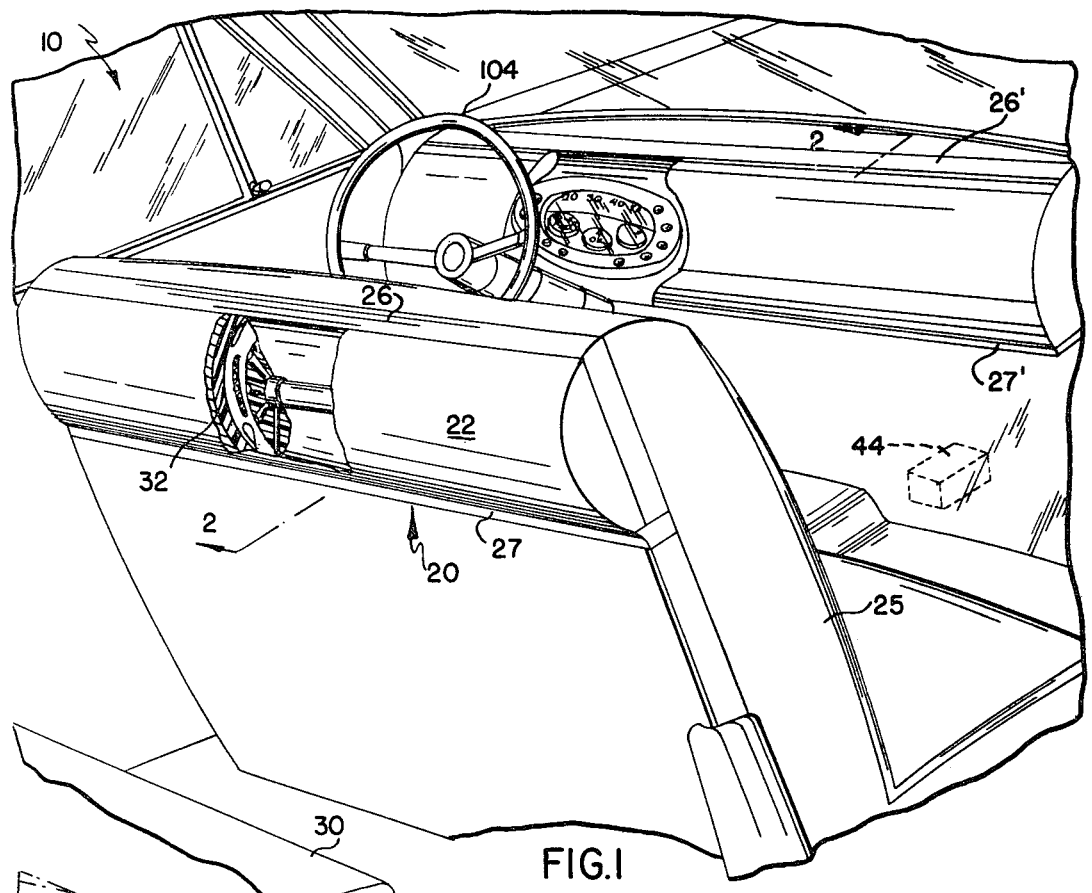
FIG. 1 is a fragmentary perspective view of an interior of an automobile and showing the novel safety apparatus of the present invention embodied therein.
Figure 2:
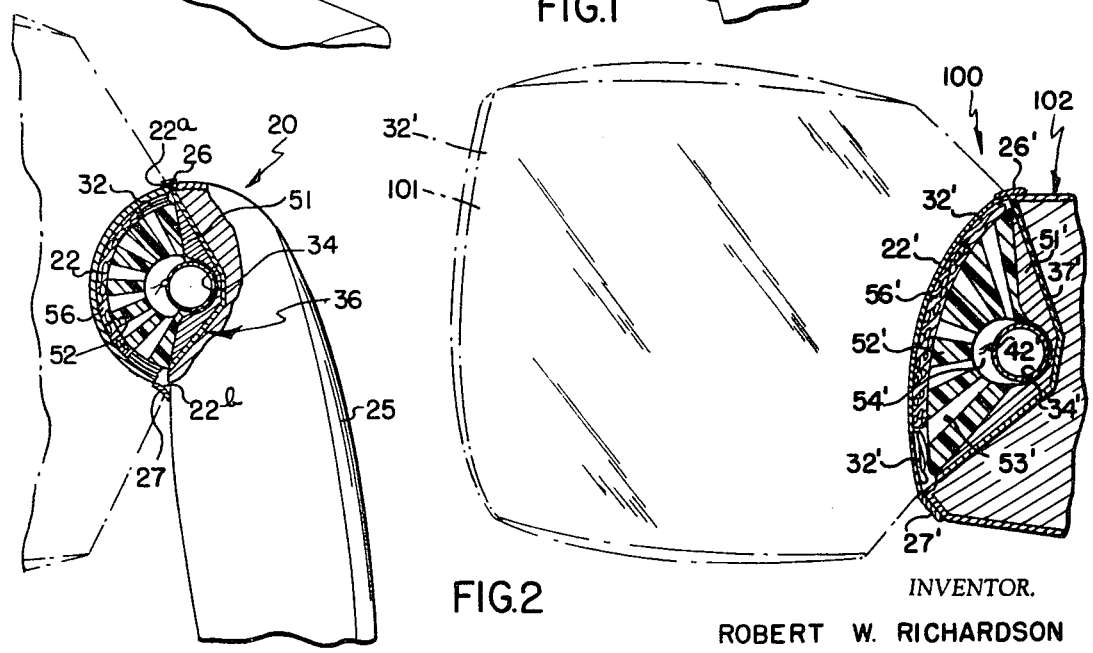
FIG. 2 is a fragmentary sectional view taken approximately along line 2—2 of FIG. 1.

Referring to FIGS. 1 and 2 of the drawing, a safety device 20 and associated panel 22 are there shown as being mounted on the upper portion of the back side of a front seat 25 of the automobile 10. The panel 22 is an elongate, curved panel contoured as desired and extends generally lengthwise across the upper portion of the back side of the front seat 25. The panel 22 is made of a suitable material and is contoured so as to form a smooth continuation of the design of the front seat and to give a pleasing appearance. The panel 22 along its upper and lower sides 22a, 22b is releasably connected or secured to the top and back side of the front seat 25 by any suitable means, such as strips of molding tape 26, 27, respectively. The molding tapes 26, 27 may be made from any suitable material and are adhesively secured to the panel 22 and the front seat 25. It will, of course, be understood that other techniques for releasably securing the panel 22 to the front seat 25 could be used in place of the molding tapes, if desired.

Figure 3:
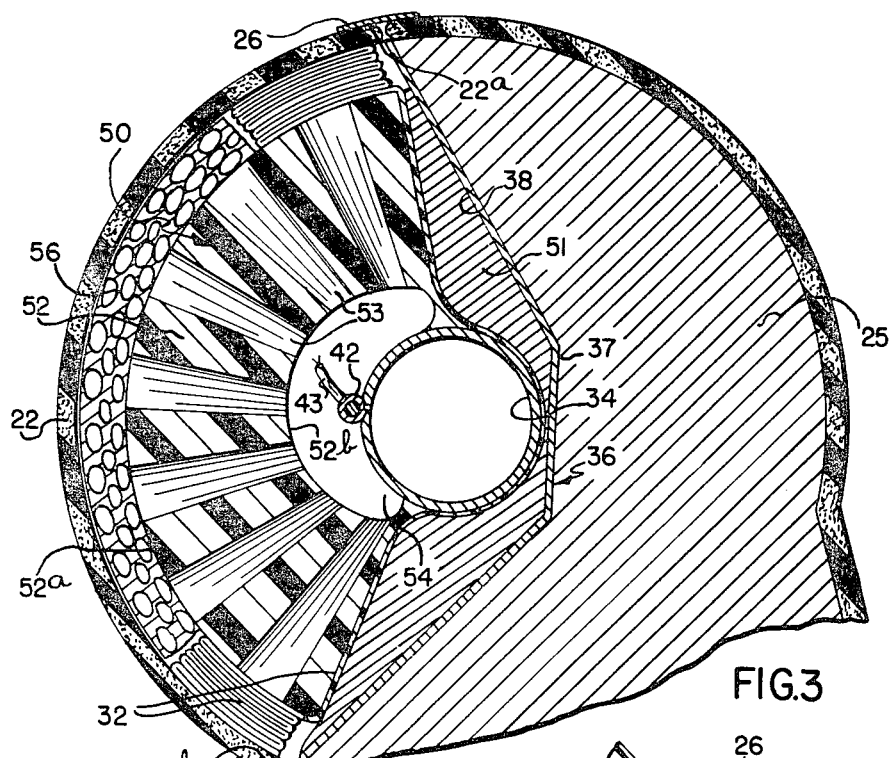
FIG. 3 is an enlarged fragmentary sectional view of part of the safety apparatus shown in FIG. 2.

The panel 22 is adapted to be moved towards the front side of the back seat 30 of the vehicle to restrain any occupant or occupants sitting in the back seat of the vehicle when a collision is occurring. To this end, an inflatable confinement or bag 32 is provided. The inflatable confinement 32 has one end suitably secured to the inner side of the panel 22 and the other end extending around a container 34 having a supply of compressed fluid, such as nitrogen. The inflatable confinement 32 is normally disposed in a folded condition, as best shown in FIG. 3, when the panel 22 is releasably secured to the back side of the front seat 25 by the molding tapes 26, 27. The confinement 32 is movable from its folded condition, as shown in FIG. 3, to an inflated position, as shown in FIG. 2, in which it is effective to restrain the occupants sitting in the back seat of the vehicle when the compressed fluid in the container 34 is released. The molding tapes 26, 27 for releasably securing the panel 22 to the front seat 25 are torn or sheared when the confinement 32 is inflated and the panel 22 and confinement 32 are moved as a unit rearwardly toward the back seat 30.

The container 34 is an elongate container having its opposite ends secured to a pair of side plates (not shown) of a bracket or support member 36. The bracket member 36 besides the side plates also includes a bottom plate 37 which is secured to the back side of the front seat 25 in any suitable manner. Preferably, the back side of the front seat 25 of the automobile 10 will have an elongated recess or cavity 38 extending longitudinally thereacross and the bottom plate 37 of the bracket member 36 will be contoured so as to fit snugly within the recess 38 when it is secured thereto.

The compressed fluid within the container 34 is released to cause inflation of the confinement 32 by actuating means in response to a collision occurring. To this end, the cylindrical container 34 has an explosive charge or detonator 42 associated therewith. The charge 42 is suitably connected with lead wires 43. The lead wires 43 are connected with any suitable collision-sensing means, such as shown schematically at 44 in FIG. 1. The collision-sensing device would be electrically connected with the battery of the automobile or a separate battery and the charge 42 via the lead wires 43.

Figure 4:
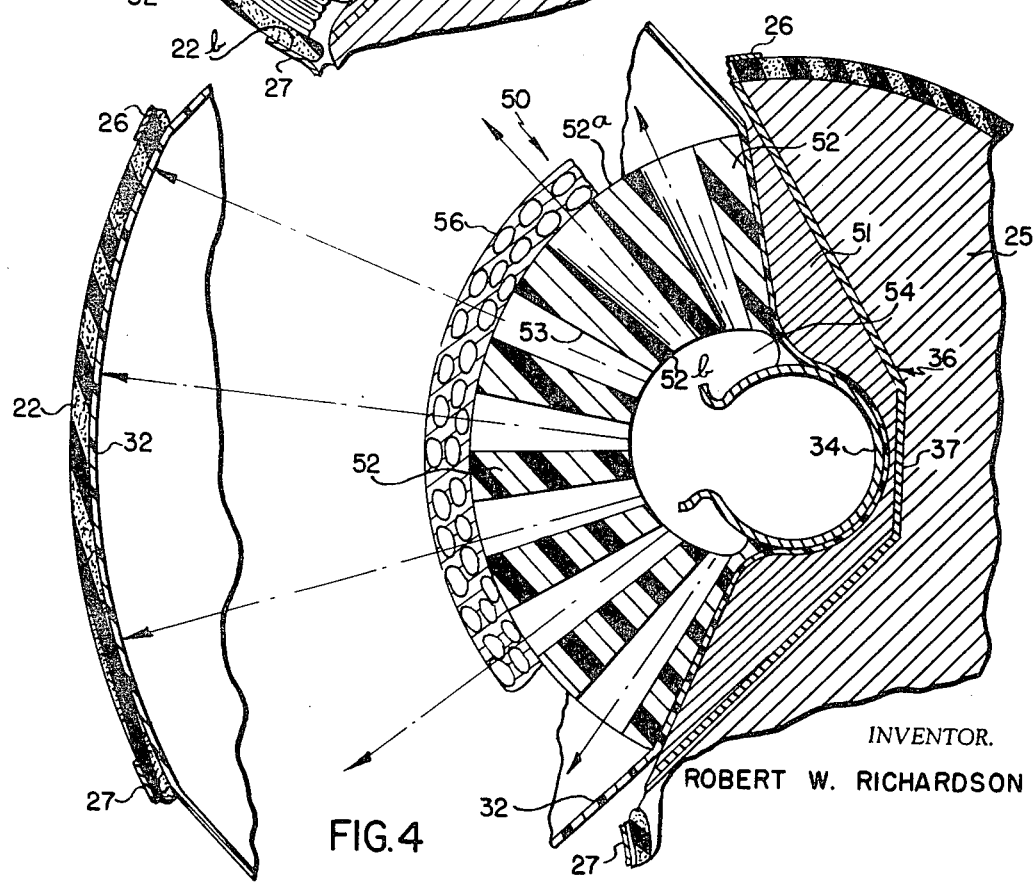
FIG. 4 is an enlarged fragmentary sectional view of part of the safety apparatus shown in FIG. 2.

The safety device 20 also includes resilient cushion or padding means 50, for preventing injuries to the occupant or occupants sitting in the back seat 30 when the latter are injured thereagainst during a noncritical collision when the confinement 32 is not inflated. The cushion means 50 may comprise a first cushion or pad 51 of suitable slow return energy-absorbing material disposed between the confinement and the bottom side 37 of the bracket member 36. As best shown in FIGS. 3 and 4, the cushion 51 surrounds the rearward side of the container 34 and extends laterally thereof.

The cushion means 50 further comprises a combined porous cushion and diffuser 52 disposed between the container 34 and the inner side of the panel 22. The cushion and diffuser 52 is herein shown as being generally semicircular in shape and has an outer side of periphery 52a whose radius of curvature conforms to the inner periphery of the panel 22 and an inner side or periphery 52b which is spaced from and surrounds a portion of the side of the container 34. The cushion and diffuser 52 is made from a suitable slow return energy-absorbing material and is provided with a plurality of generally radially or laterally extending passages 53 therethrough to permit the compressed fluid from the container 34 to flow into the interior of the confinement 32 to inflate same. The inner periphery 52b of the cushion 52 defines with the adjacently located side of the container 34 an expansion or diffusion chamber 54 into which the compressed fluid from the container 34 flows prior to passing through the passages 53. The cushion 52 thus is constructed as a diffuser tube and controls the rate of inflation of the confinement 32.

The cushion means 50 additionally comprises a curved porous pad 56 secured or bonded to the outer periphery of the cushion 52. The pad 56 is also made from a porous, suitable slow return energy-absorbing material. The pad 56 is preferably of a uniform radial thickness and its inner and outer peripheries have substantially the same contour as the contour of the periphery 52a of the pad 52 and the inner side of the panel 22. The pad 56 is provided so as to fill the space between the inner side of the panel 22 and the outer periphery of the cushion 52 and between the opposite sides of the bag when in its folded condition, as shown in FIG. 3.

When a critical collision is occurring the collision sensing means 44 may be actuated to complete an electric circuit and the current flowing through lead wires 43 causes the charge 42 to explode. The explosion of the charge 42 causes the container 34 to be opened to release the compressed fluid from the container into the inflatable confinement 32. The confinement 32 when being inflated moves away from the back side of the front seat 25 toward the front side of the back seat 30 and the pressure exerted against the panel 22 causes the molding strips 26, 27 to be torn and the panel 22 to be moved in the same direction. The panel and confinement when fully inflated, as shown in FIG. 4, provide a restraint for the occupants sitting in the back seat of the vehicle to prevent the same from being hurled at high velocity forwardly and thus, serve to protect and prevent injury to the occupants.

From the foregoing, it should be apparent that during a noncritical crash when the confinement 32 is not inflated and if the occupant in the back seat impacts against the panel 22, that the pad 56 and the crushable cushions 52, 51 will cushion the impact of the occupant and prevent injury. The construction and arrangement of the cushion means 50 are such that it will absorb the energy of the occupant upon being impacted thereagainst and, thus, prevent or minimize rebound of the occupant. This cushion structures also provides a cushion against which the panel 22 can bottom or engage in the event the occupant in the rear seat would be hurled against the panel at such a force upon the confinement being inflated that the panel 22 would be moved into engagement with the pad 56.

It should be noted that the panel 22, inflatable confinement 32, the cushion means 50, and the container 34 comprise a preassembled unit which may be mounted directly in the recess 38 of the back seat of the automobile 10. The lead wires 43 may be connected with a plug which can be connected with a socket connected with wires connected to the sensing device (not shown). It should also be apparent that the safety device 20 is of a relatively compact and simple construction and will prevent injury to the occupant irrespective of whether a noncritical or critical collision is occurring.

Referring to FIGS. 1 and 2 of the drawing, a safety device 100 for protecting the occupants sitting in the front seat 25 of the automobile during a collision is there shown. The safety device 100 is of a unitary construction and includes a panel 22' which forms at least a portion of the dashboard of the vehicle, the safety device 100 being mounted on suitable support means 102 on the automobile 10. The safety device 100 in all other respects is of a similar construction to and operated in the same manner as the safety device 20, and corresponding parts of the safety device 100 will be given the same reference numerals as the safety device 20 but with a prime affixed thereto.

The dashboard panel portion 22' may be of any suitable contour or shape and is releasably secured to its upper and lower side edges to the adjacent dashboard structure in any suitable manner, such as by molding tapes or strips 26', 27'. The dashboard panel portion 22' extends from the right side of the vehicle, as viewed in FIG. 1, to a position adjacent the steering column means 104 of the automobile 10. The dashboard panel portion 22' is made from a suitable slow return energy-absorbing material, and is adapted to be moved with the inflatable confinement 32' relative to the occupants sitting in the front seat of the automobile 10 when a critical collision is occurring.

From the foregoing, it can be seen that the safety device 100 during a noncritical collision when the confinement 32' is not inflated prevents injury to the occupants sitting in the front seat upon the latter impacting against the dashboard panel portion 22' due to the provision of the crushable cushion means 50', and in the same manner as hereinbefore described in connection with the cushion means 50 of the safety device 20. During a critical collision, the explosive charge 42' is exploded to release the compressed fluid in the container 34' to inflate the confinement 32'. The charge 42' is electrically connected with the collision sensing means 44 and in the same manner as the charge 42 of the safety device 20 is connected with the sensing device. The confinement 32' upon being inflated will move the dashboard panel portion 22' toward the front seat 25 to a position such that the dashboard portion 22' and confinement 32' will retain the occupants sitting in the front seat 25 against forward motion.

It will, of course, be understood that the dashboard portion between the steering column 104 and the left side of the automobile 10, as viewed in FIG. 1, could also be moved toward the front seat 25 during a critical collision, if desired. In such a construction, both dashboard portions could have their ends adjacent the steering column means 104 contoured so as to just clear the steering column means 104 so that the shoulders of the driver would engage the adjacent end portions of the dashboard portions whereby the driver would also be restrained against forward movement.

Figure 5:
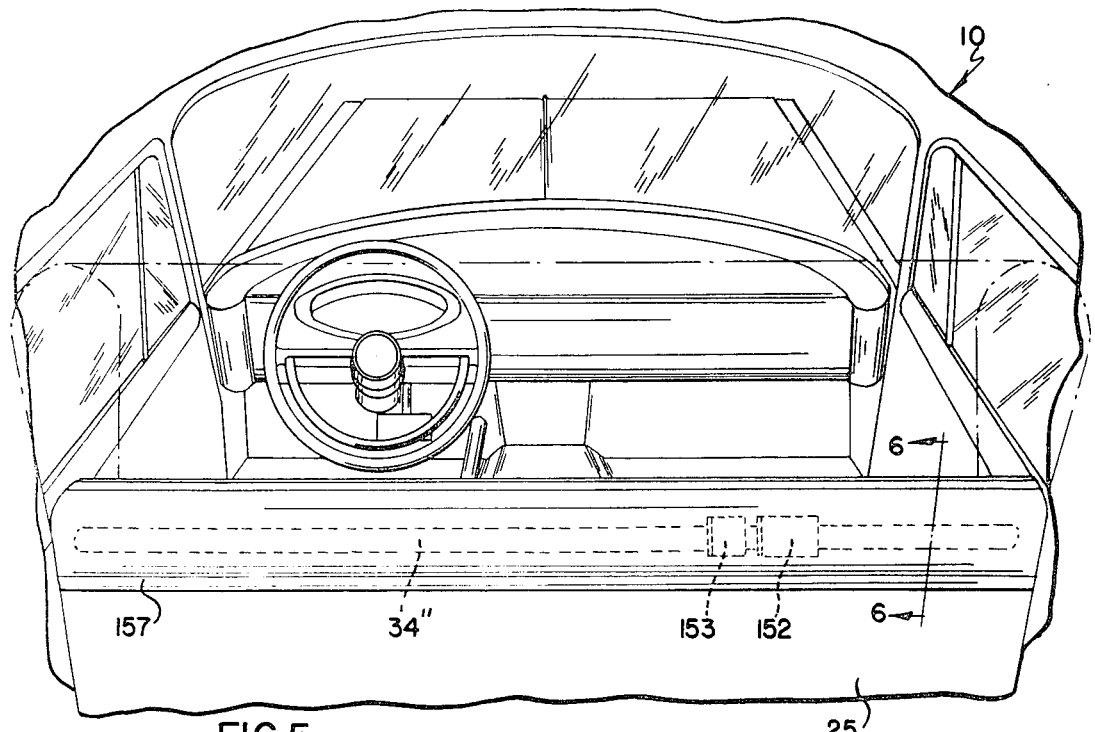
FIG. 5 is a fragmentary perspective view of an interior of an automobile and showing another embodiment of the safety apparatus of the present invention.
Figure 6:
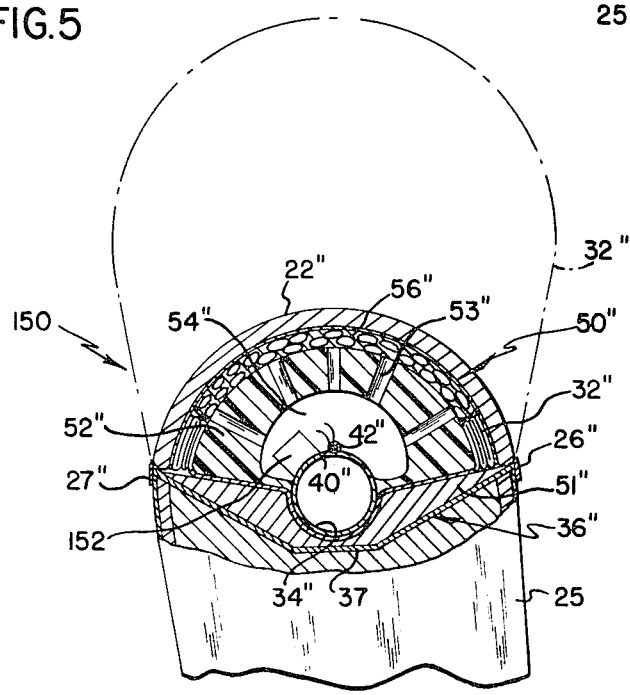
FIG. 6 is an enlarged sectional view taken approximately along line 6—6 of FIG. 5.

FIGS. 5 and 6 of the drawing show an alternate form of safety device 150 which may be mounted on the top of the front seat 25 and which is adapted to protect the occupants sitting in the front seat 25 against whiplash injuries during a collision. The safety device 150 is operable to provide a headrest to restrain movement of the occupants rearwardly relative to the front seat during a collision. The safety device 150 is of a unitary construction and includes a panel 22" which is contoured and styled so as to form the top portion of the front seat 25 of the automobile. The safety device 150 also includes a collision sensing means 152 and a battery 153 as part of the unitary construction. The safety device 150, except for the contour of the panel 22" and except for the sensing means 152 and battery 153, is of a similar construction to and operated in the same manner as the safety device 20, and corresponding parts of the safety device 150 will be given the same reference numerals as the safety device 20 but with a double prime affixed thereto.

The panel 22" may be contoured and styled as desired, and is releasably secured to the upper part of the front seat in any suitable manner, such as by molding tapes or strips 26", 27". The panel 22" preferably extends across the front seat of the vehicle, as viewed in FIG. 5. The panel 22" is made from a suitable slow return energy-absorbing material and is adapted to be moved with the inflatable confinement 32" upwardly relative to the front seat 25 toward the ceiling of the automobile to provide a headrest, as shown by the dotted lines in FIG. 5, when a critical collision is occurring.

The collision-sensing means 152 may be of any suitable or conventional construction. The sensing means 152 is mounted on the container in any suitable manner and is disposed within the confinement 32", as schematically shown in FIGS. 5 and 6. Likewise, the battery 32"suitable housing mounted on the container 32" in any suitable manner. The battery 153 is 153 is contained in a interconnected with the sensing means 152 and the explosive charge 42" by suitable conductors or wires to form a circuit. The battery 153 and sensing means 152 could alternatively be mounted in the container 34".

From the foregoing, it can be seen that when a critical collision is occurring, the sensor 152 will be actuated to complete an electric circuit from the battery through the explosive charge 42' and cause the latter to be exploded to release the compressed fluid in the container 34" to inflate the confinement 32". The confinement 32" upon being inflated will move the panel 22" upwardly relative to the front seat toward the ceiling of the automobile to a position such that the panel and the inflatable confinement provide a headrest, as shown by the dotted lines in FIG. 5, to restrain the occupants sitting in the front seat against rearward movement and thus, prevent whiplash injuries to the occupants due to rebound.

It will, of course, be understood that the safety device 150 could also be mounted on the top of the back seat of the vehicle so as to provide a headrest for the occupants sitting in the back seat and, thus, prevent whiplash injuries to the occupants sitting in the back seat. Also, it should be understood that the provision of mounting a battery and sensor within the inflatable confinement and on the container could also be applied to the safety devices 200 and 100, if desired. Additionally, it should be noted that the safety devices, like those heretofore described, could be mounted in the doors or at any other suitable locations in the automobile 10.

From the foregoing, it should be apparent that the hereinbefore enumerated objects and others have been accomplished and that a new and improved safety apparatus for use in a vehicle has been provided. Although the illustrated embodiment herein has been described in great detail, it should be apparent that certain modifications, changes, and adaptations may be made in the illustrated embodiment and that it is hereby intended to cover all such modifications, and adaptations which come within the scope of the appended claims.

What is claimed is:

1. A safety device for mounting on the back side of a front seat of an automotive vehicle and which is operable to protect an occupant sitting in the back seat of the vehicle during a collision, said safety device comprising support means for mounting on the back side of the front seat, a container supported by said support means and which contains a supply of compressed fluid, an inflatable confinement having an interior in communication with said fluid supply, said confinement being normally disposed in a collapsed condition within the back of the front seat of the vehicle, a panel secured to said confinement and having a contour forming a continuation of the back seat of the vehicle when said confinement is collapsed, first means for releasably connecting said panel in position forming a continuation of the front seal with the panel overlying said confinement, and second means operable when actuated to effect release of said fluid from said container to inflate said confinement to move said panel toward the back seat of the vehicle to restrain movement of an occupant thereof during a vehicle collision.

2. A safety device as defined in claim 1 wherein said device extends substantially longitudinally across the full length of the back of the front seat.

3. A safety device which is operable when actuated to protect an occupant sitting in a front seat of an automotive vehicle during a collision, said safety device comprising support means for mounting on an interior vehicle support, a container supported by said support means and which contains a supply of compressed fluid, an inflatable confinement having an interior in communication with said container, said confinement being normally disposed in a collapsed condition, a contoured dashboard portion secured to said confinement and forming a portion of the dashboard of the vehicle, first means for releasably securing said dashboard portion to an adjacent vehicle support, said second means operable when actuated to effect release of said fluid from said container to inflate said confinement to move the dashboard portion toward the front seat of the vehicle to restrain movement of an occupant thereof during a vehicle collision.

4. A safety device for mounting on the top of a seat of an automotive vehicle and which is operable to provide a headrest to protect an occupant sitting in the seat of the vehicle during a collision, said safety device comprising support means for mounting on the top of the seat, a container supported by said support means and which contains a supply of compressed fluid, an inflatable confinement having an interior in communication with said fluid supply, said confinement being normally disposed in a collapsed condition within the top of the seat of the vehicle, a panel secured to said confinement and having a contour forming a continuation of the seat of the vehicle when said confinement is collapsed, first means for releasably connecting said panel in position forming a continuation of the seat with the panel overlying said confinement, and second means operable when actuated to effect release of said fluid from said container to inflate said confinement to move said panel upwardly relative to the seat of the vehicle to provide said headrest during a vehicle collision.

* * * * *